United States Patent
Wu et al.

(10) Patent No.: US 12,046,754 B2
(45) Date of Patent: Jul. 23, 2024

(54) ALUMINUM BATTERY NEGATIVE ELECTRODE STRUCTURE

(71) Applicant: APh ePower Co., Ltd., Kaohsiung (TW)

(72) Inventors: Jui-Hsuan Wu, Kaohsiung (TW); Shih Po Ta Tsai, Kaohsiung (TW); Yi Hsiu Wang, Kaohsiung (TW); Wei-An Chen, Kaohsiung (TW)

(73) Assignee: APh ePower Co., Ltd., Kaohsiung (TW)

( * ) Notice: Subject to any disclaimer, the term of this patent is extended or adjusted under 35 U.S.C. 154(b) by 0 days.

(21) Appl. No.: 17/978,999

(22) Filed: Nov. 2, 2022

(65) Prior Publication Data

US 2023/0231132 A1 Jul. 20, 2023

(30) Foreign Application Priority Data

Jan. 14, 2022 (TW) .................. 111101641

(51) Int. Cl.
| | |
|---|---|
| *H01M 4/583* | (2010.01) |
| *H01M 4/04* | (2006.01) |
| *H01M 4/62* | (2006.01) |
| *H01M 4/66* | (2006.01) |
| *H01M 10/054* | (2010.01) |
| *H01M 10/647* | (2014.01) |
| *H01M 4/02* | (2006.01) |

(52) U.S. Cl.
CPC ......... *H01M 4/583* (2013.01); *H01M 4/0404* (2013.01); *H01M 4/622* (2013.01); *H01M 4/625* (2013.01); *H01M 4/661* (2013.01); *H01M 10/647* (2015.04); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 11,258,137 | B2 * | 2/2022 | Huang | ................ H01M 50/429 |
| 2017/0263386 | A1 * | 9/2017 | Ishikawa | ............... H01M 4/133 |
| 2018/0277900 | A1 * | 9/2018 | Abe | .................... H01M 4/525 |
| 2018/0287162 | A1 | 10/2018 | Tour et al. | |

FOREIGN PATENT DOCUMENTS

| | | |
|---|---|---|
| CN | 108630945 | 10/2018 |
| CN | 104952629 | 5/2019 |
| CN | 110010883 | 7/2019 |

(Continued)

OTHER PUBLICATIONS

"Search Report of Europe Counterpart Application", issued on Jun. 21, 2023, p. 1-p. 8.

(Continued)

*Primary Examiner* — Tracy M Dove
(74) *Attorney, Agent, or Firm* — JCIPRNET

(57) ABSTRACT

An aluminum battery negative electrode structure includes an aluminum foil and a coating layer. The coating layer is arranged on the aluminum foil. A material of the coating layer includes a high specific surface area carbon material. A specific surface area of the high specific surface area carbon material ranges from 500 $m^2/g$ to 3,000 $m^2/g$.

8 Claims, 2 Drawing Sheets

(56) References Cited

FOREIGN PATENT DOCUMENTS

| | | |
|---|---|---|
| JP | 2017050294 | 3/2017 |
| KR | 20200026055 | 3/2020 |
| TW | 202027330 | 7/2020 |

OTHER PUBLICATIONS

"Search Report of Korea Counterpart Application", issued on Jul. 1, 2023, p. 1-p. 4.
"Office Action of Japan Counterpart Application", issued on Jul. 4, 2023, p. 1-p. 2.
"Office Action of Korea Counterpart Application", issued on Feb. 2, 2024, p. 1-p. 4.

* cited by examiner

ALUMINUM BATTERY NEGATIVE ELECTRODE STRUCTURE

CROSS-REFERENCE TO RELATED APPLICATION

This application claims the priority benefit of Taiwanese application No. 111101641, filed on Jan. 14, 2022. The entirety of the above-mentioned patent application is hereby incorporated by reference herein and made a part of this specification.

BACKGROUND

Technical Field

The disclosure relates to an aluminum battery. In particular, the disclosure relates to an aluminum battery negative electrode structure.

Description of Related Art

An aluminum battery is a new type of an electrochemical energy storage element with a metal aluminum foil serving as a negative electrode, and has relatively good safety and relatively low cost. The aluminum battery negative electrode is typically improved and designed with a number of factors taken into consideration.

For example, in the aluminum battery, the aluminum foil negative electrode may undergo an electrochemical deposition reaction during charging. In addition, crystals in a sharp branch-like shape (referred to as dendrite) may form and grow along an electric field direction due to uneven distribution of electrons during the process of deposition. Therefore, the dendrites are likely to penetrate an separator and contact a positive terminal, causing a short circuit in the aluminum battery and reducing its life.

SUMMARY

The disclosure provides an aluminum battery negative electrode structure, which can improve adverse effects of dendrites on an aluminum battery, therefore improving the life of the aluminum battery.

According to an embodiment of the disclosure, an aluminum battery negative electrode structure includes an aluminum foil and a coating layer. The coating layer is arranged on the aluminum foil. A material of the coating layer includes a high specific surface area carbon material. A specific surface area of the high specific surface area carbon material ranges from 500 $m^2/g$ to 3,000 $m^2/g$.

In an embodiment of the disclosure, the high specific surface area carbon material includes activated carbon.

In an embodiment of the disclosure, the material of the coating layer further includes a conductive material.

In an embodiment of the disclosure, the conductive material includes conductive carbon black, Ketjen black, a carbon nanotube, graphene, acetylene black, or a combination thereof.

In an embodiment of the disclosure, the doping ratio of the conductive material in the coating layer is between 2 wt% and 50 wt%.

In an embodiment of the disclosure, the material of the coating layer further includes a binding material.

In an embodiment of the disclosure, the binding material includes cellulose or rubber.

In an embodiment of the disclosure, a thickness of the coating layer ranges from 10 micrometers to 100 micrometers.

In an embodiment of the disclosure, the aluminum battery negative electrode structure is adapted for a pouch-cell-type aluminum battery.

In an embodiment of the disclosure, the coating layer is directly coated on the aluminum foil.

Based on the foregoing, in the aluminum battery negative electrode structure of the embodiments of the disclosure, a number of nucleation points are provided on a surface of the aluminum foil by disposing the coating layer including the high specific surface area carbon material on the aluminum foil, so that the dendrites can grow uniformly on the surface of the aluminum foil at a relatively slow speed. Accordingly, the adverse effects of the dendrites on the aluminum battery can be improved, therefore improving the life of the aluminum battery.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To facilitate understanding of the disclosure, embodiments are particularly provided below to serve as examples according to which the disclosure can be reliably implemented. For clarity in description, many practical details will be described together in the following description. It should be understood, however, that these practical details should not be construed to limit the disclosure. In other words, these practical details are not essential in some embodiments of the disclosure.

Unless otherwise defined, all terms (including technical and scientific terms) used herein have the same meaning as commonly understood by those skilled in the art.

Figure 1:
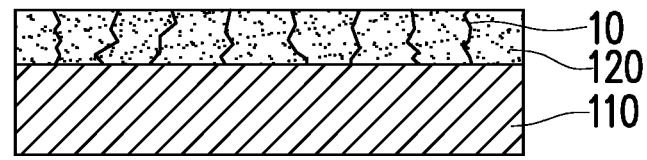
FIG. 1 is a schematic partial cross-sectional view of an aluminum battery negative electrode structure according to an embodiment of the disclosure.
Figure 2A:
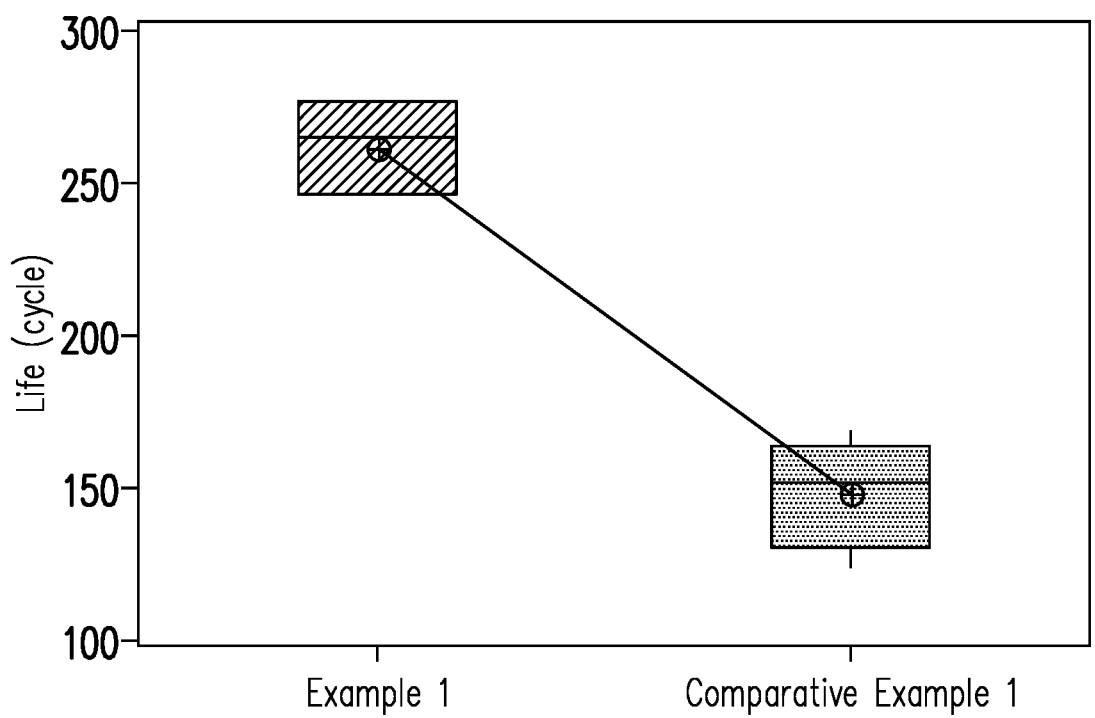
FIG. 2A is a schematic diagram showing results of comparing lives of Example and Comparative Example.
Figure 2B:
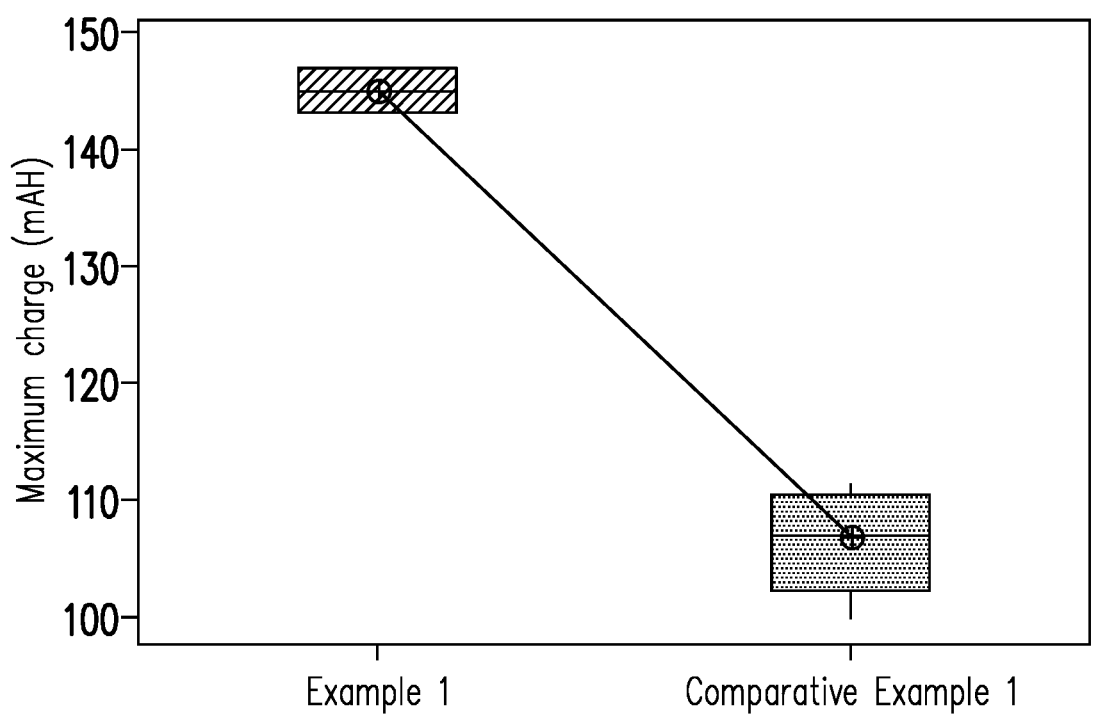
FIG. 2B is a schematic diagram showing results of comparing maximum charges of Example and Comparative Example.

FIG. 1 is a schematic partial cross-sectional view of an aluminum battery negative electrode structure according to an embodiment of the disclosure. FIG. 2A is a schematic diagram showing results of comparing lives of Example and Comparative Example. FIG. 2B is a schematic diagram showing results of comparing maximum charges of Example and Comparative Example.

With reference to FIG. 1, FIG. 2A, and FIG. 2B, an aluminum battery negative electrode structure 100 in this embodiment includes an aluminum foil 110 and a coating layer 120. The coating layer 120 is arranged on the aluminum foil 110. Further, a material of the coating layer 120 includes a high specific surface area carbon material. A specific surface area of the high specific surface area carbon material ranges from 500 m²/g (square meter/gram) to 3,000 m²/g (e.g., 1,000 m²/g, 1,300 m²/g, 1,500 m²/g, 1,700 m²/g, 2,000 m²/g, 2,500 m²/g, or any value within the range from 500 m²/g to 3,000 m²/g). Accordingly, in the aluminum battery negative electrode structure 100 of the this embodiment, a number of nucleation points are provided on a surface of the aluminum foil 110 by disposing the coating layer 120 including the high specific surface area carbon material on the aluminum foil 110, so that dendrites 10 can grow uniformly on the surface of the aluminum foil 110 at a relatively slow speed (as shown in FIG. 1A, the dendrites 10 grow uniformly on the aluminum foil 110). Accordingly, the adverse effects of the dendrites on the aluminum battery can be improved, therefore improving the life of the aluminum battery.

Further, the high specific surface area carbon material may provide sufficient reaction sites to improve aluminizing the negative electrode. Therefore, in this embodiment, there are a number of porous structures on the surface of the aluminum foil 110 that causes active matters (e.g., $Al_2Cl_7^-$, $AlCl_4^-$) in an electrolyte to deposit aluminum, making the aluminum coating layer uniform, so as to alleviate rapid accumulation of dendrites on the surface of the aluminum foil due to insufficient nucleation points.

In some embodiments, the high surface area carbon material includes activated carbon. Therefore, in this embodiment, a number of nucleation points are provided on the surface of the aluminum foil 110 by directly coating the surface of the aluminum foil 110 with a highly porous activated carbon material to serve as the negative electrode (anode) current collector material in the aluminum battery, with the properties of the high specific surface area. As such, active matters may perform a hot-dip aluminizing reaction in the porous structures, uniformly forming the aluminum plating layer. This greatly alleviates a short circuit in the battery caused by rapid growth of dendrites penetrating the separator and contacting the positive electrode due to insufficient nucleation points, which is common in conventional batteries since only a metal foil material is used as the negative electrode current collector. Therefore, the life of the aluminum battery can be improved. Nonetheless, the disclosure is not limited thereto.

In some embodiments, the material of the coating layer 120 further includes a conductive material to effectively reduce the electrochemical impedance. As such, a great number of aluminizing reactions may be performed, improving the utilization rate of active matters in the aluminum battery, and increasing the discharge capacity of the aluminum battery. Accordingly, adversely affected life performance of the aluminum battery caused by dendrites during aluminizing can further be effectively alleviated. For example, the conductive material may include conductive carbon black, Ketjen black, a carbon nanotube, graphene, acetylene black, or a combination thereof.

Further, the coating layer 120 may be coated in a paste-form on the surface of the aluminum foil 110. The process is simple and facilitates large-scale production. In addition, the conductive material may be doped into a paste. By doping a fixed ratio of the conductive material into the paste, the conductive material with the properties of relatively high conductivity and a relatively small particle size may be uniformly dispersed into a structure between the aluminum foil 110 and the high specific surface area carbon material, forming a chain-like conductive structure between the aluminum foil 110 and the high specific surface area carbon material, which improves the electronic conductivity on the surface, and facilitates transfer of electrons from the aluminum foil 110 (the current collector) to the surface of the high specific surface area carbon material. In addition, the improvement to the surface conductivity can generate a great number of aluminum plating reactions, further improving the utilization of active matters in an electrolyte, and therefore achieving relatively good performance in the maximum charge.

In some embodiments, the ratio of doping the conductive material into the coating layer 120 may range from 2 wt % to 50 wt % (e.g., 2 wt %, 5 wt %, 10 wt %, 30 wt %, 50 wt %, or any value within the range from 2 wt % to 50 wt %), but the disclosure is not limited thereto. The conductive material is optionally added into the coating layer 120. In other words, it is possible not to add the conductive material into the coating layer 120.

In some embodiments, a binding material may added into the paste reliably adhere the coated paste to the surface of the aluminum foil 110. Therefore, the material of the coating layer 120 further includes a binding material. The binding material may include cellulose or rubber. For example, the cellulose may be carboxymethyl cellulose, hydroxyethyl cellulose, methyl cellulose, or hydroxypropyl methyl cellulose. The rubber may be styrene-butadiene rubber, polyacrylic acid, or polyvinyl alcohol. Nonetheless, the disclosure is not limited thereto. Any appropriate material with binding properties may be used as the binding material.

In some embodiments, a thickness of the coating layer 120 ranges from 10 micrometers (μm) to 100 μm (e.g., 10 μm, 30 μm, 50 μm, 70 μm, 100 μm, or any value within the range from 10 μm to 100 μm) to achieve relatively good improvement, but the disclosure is not limited thereto.

In some embodiments, the aluminum battery negative electrode structure 100 is adapted for a pouch-cell-type aluminum battery, and an ionic liquid electrolyte may be used for the pouch-cell-type aluminum battery, but the disclosure is not limited thereto. The aluminum battery negative electrode structure 100 may also be adapted for aluminum batteries in other appropriate types.

The efficacy of the disclosure will be described in more details below with reference to Example 1 and Comparative Example 1. In addition, although Example 1 below is described, the details of the materials used, the procedures, and the like may be appropriately changed without departing from the scope of the disclosure. Therefore, the disclosure should not be construed to be limited by Example 1 described below.

Example 1

In Example 1, an aluminum battery negative electrode structure includes an aluminum foil and a coating layer arranged thereon, where a high specific surface area carbon material used in the coating layer is activated carbon, a specific surface area is 1,500 m²/g, and the aluminum battery is a pouch-cell-type aluminum battery.

Comparative Example 1

In Comparative Example 1, an aluminum battery negative electrode structure includes an aluminum foil (without disposing a coating layer), and the aluminum battery is also a pouch-cell-type aluminum battery.

Here, the rest unexplained compositions and specifications of the aluminum batteries should be obtainable by those skilled in the art according to any content encompassed within the spirit and scope of the appended claims.

FIG. 2A and FIG. 2B shows tests on lives and maximum charges with the charging voltage between 1 volt (V) and 2.6 volts and the charging and discharging rate of 4C. The results of FIG. 2A and FIG. 2B show improvement to the life and the maximum charge in Example 1 compared with Comparative Example 1.

In summary of the foregoing, in the aluminum battery negative electrode structure of the embodiments of the disclosure, a number of nucleation points are provided on a surface of the aluminum foil by disposing the coating layer including the high specific surface area carbon material on the aluminum foil, so that the dendrites can grow uniformly on the surface of the aluminum foil at a relatively slow speed. Accordingly, the adverse effects of the dendrites on the aluminum battery can be improved, therefore improving the life of the aluminum battery.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pouch-cell-type aluminum battery comprising:
   an electrolyte, comprising $Al_2Cl_7^-$ and $AlCl_4^-$; and
   a negative electrode structure, comprising:
      an aluminum foil; and
      a coating layer arranged on the aluminum foil, wherein a material of the coating layer comprises a high specific surface area carbon material, a specific surface area of the high specific surface area carbon material ranges from 500 $m^2/g$ to 3,000 $m^2/g$, the coating layer is directly coated on the aluminum foil.

2. The pouch-cell-type aluminum battery according to claim 1, wherein the high specific surface area carbon material comprises activated carbon.

3. The pouch-cell-type aluminum battery according to claim 1, wherein the material of the coating layer further comprises a conductive material.

4. The pouch-cell-type aluminum battery according to claim 3, wherein the conductive material comprises conductive carbon black, Ketjen black, a carbon nanotube, graphene, acetylene black, or a combination thereof.

5. The pouch-cell-type aluminum battery according to claim 3, wherein the conductive material is doped in an amount of 2 wt % and 50 wt %, based on the total weight of the coating layer.

6. The pouch-cell-type aluminum battery according to claim 1, wherein the material of the coating layer further comprises a binding material.

7. The pouch-cell-type aluminum battery according to claim 6, wherein the binding material comprises cellulose or rubber.

8. The pouch-cell-type aluminum battery according to claim 1, wherein a thickness of the coating layer ranges from 10 micrometers to 100 micrometers.

* * * * *